United States Patent
Nishitani (10) Patent No.: US 8,599,516 B2
(45) Date of Patent: Dec. 3, 2013

(54) DISK DRIVE DEVICE IN WHICH REDUCTION IN UNBALANCED AMOUNT CAN BE ADJUSTED

(75) Inventor: Yuji Nishitani, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 386 days.

(21) Appl. No.: 12/889,253

(22) Filed: Sep. 23, 2010

(65) Prior Publication Data

US 2011/0109991 A1     May 12, 2011

(30) Foreign Application Priority Data

Nov. 10, 2009   (JP) .................................. 2009-256716

(51) Int. Cl.
    *G11B 17/02*     (2006.01)
(52) U.S. Cl.
    USPC .................. 360/99.08; 360/99.12; 369/263.1; 720/701; 720/702
(58) Field of Classification Search
    USPC ................. 360/99.08, 99.12; 369/263.1, 267; 720/701–702
    See application file for complete search history.

(56) References Cited

U.S. PATENT DOCUMENTS

| | | | | |
|---|---|---|---|---|
| 5,391,952 A * | 2/1995 | Simazu et al. | ............... | 310/67 R |
| 6,125,098 A * | 9/2000 | Osawa | ............ | 369/266 |
| 6,205,110 B1 * | 3/2001 | Miyamoto et al. | ............ | 369/266 |
| 6,356,409 B1 * | 3/2002 | Price et al. | ................. | 360/98.07 |
| 7,130,151 B2 * | 10/2006 | Nakamiya et al. | ......... | 360/98.07 |
| 7,342,746 B1 * | 3/2008 | Lin | ............ | 360/99.08 |
| 7,696,655 B2 * | 4/2010 | Shishido et al. | ............... | 310/51 |
| 8,156,514 B2 * | 4/2012 | Smirnov et al. | ............... | 720/701 |
| 2007/0150910 A1 * | 6/2007 | Shishido et al. | ............... | 720/701 |

FOREIGN PATENT DOCUMENTS

JP       2007198555      9/2007

* cited by examiner

*Primary Examiner* — Hoa T Nguyen
*Assistant Examiner* — Carlos E Garcia
(74) *Attorney, Agent, or Firm* — Fulwider Patton LLP (57) ABSTRACT

A disk drive device includes: a hub on which a recording disk is to be mounted; a base member; a bearing unit configured to support the hub in a manner in which the hub can be relatively rotated with respect to the base member; an extended annular groove portion provided in part of the hub around the rotational axis of the hub; and a weight member that is installed in the extended annular groove portion to adjust a rotational balance when the recording disk is being rotated with the hub. The weight member has a fixing mechanism that is slidable, when installed, in the direction of the extended annular groove portion and that can substantially maintain a stopped state at a fixing position.

16 Claims, 7 Drawing Sheets

DISK DRIVE DEVICE IN WHICH REDUCTION IN UNBALANCED AMOUNT CAN BE ADJUSTED

CROSS-REFERENCE TO RELATED APPLICATION

This application is based upon and claims the benefit of priority from the prior Japanese Patent Application No. 2009-256716, filed on Nov. 10, 2009, the entire content of which is incorporated herein by reference.

BACKGROUND OF THE INVENTION

1. Field of the Invention

The present invention relates to a disk drive device, and in particular, to a technique for adjusting a reduction in an unbalanced amount in a disk drive device.

2. Description of the Related Art

In recent years, the rotational accuracy of disk drive devices, such as HDDs, has been drastically improved by comprising fluid dynamic bearings as disclosed in, for example, Japanese Patent Application Publication No. 2007-198555. With the improvement, the disk drive devices have been demanded to have higher density and larger capacity. For example, in a disk drive device for recording data magnetically, read/write of data are performed with a magnetic head tracing over recording tracks formed on a recording disk through a slight gap between the two while the recording disk is being rotated at high speed. In order to make such a disk drive device have high density and large capacity, it is needed to make the width of the recording track narrow and to make the gap between the magnetic head and the recording disk further narrower.

Because a recording disk is rotated in a disk drive device, the magnitude of an unbalanced amount in a rotating portion becomes a problem. The unbalanced amount means a deviation amount between the center of gravity of an object and the rotational center of the object when the object is in a motionless state or is being rotated. When an unbalanced amount in a rotating portion of the disk drive device is large, the vibration during the rotation becomes large, thereby it is likely to cause a so-called off-track in which the magnetic head deviates from the normal position, for example, the center of the recording track, when the magnetic head is tracing over the recording track. As stated above, when intending to make the width of the recording track narrow for high density and large capacity of the disk drive device, an influence by the off-track comes to appear remarkably, thereby causing the error rate in reading/writing data to be deteriorated. That is, when an unbalanced amount in the disk drive device becomes large, high density and large capacity of the disk drive device are hampered.

As one of factors by which an unbalanced amount of a disk drive device (hereinafter, the unbalanced amount is referred to as the DBT) is determined, there is the unbalanced amount of a hub itself before a recording disk is installed (hereinafter, the unbalanced amount is referred to as the DBH). In addition, in a state where a recording disk is installed in the outer cylinder portion of the hub, if the gap occurring between the center hole of the recording disk and the outer cylinder portion of the hub deviates to one side, the position of the center of gravity deviates from the rotational center. The deviation occurring when the recording disk is installed becomes one of other factors by which the magnitude of an unbalanced amount is determined. That is, there is an unbalanced amount occurring due to the installation of the recording disk (hereinafter, the unbalanced amount is referred to as the DBD). Accordingly, in accordance with a coincidental combination of the DBH and the DBD, the DBT sometimes becomes large by superimposing the two one on another, or sometimes becomes small by offsetting each other. As a result, a variation in the DBT becomes large, and hence the high density, the large capacity, and the quality stability of disk drive devices have been hampered. Accordingly, it has been tried to make each of the DBH and the DBD small in order to make the DBT small.

As stated above, it can be considered that each of the DBH and the DBD should be made small in order to make the DBT small. For example, as a means for making the DBH small, it can be considered that the part accuracy is improved with each hub being additionally subjected to unbalanced amount adjusting machining in accordance with its unbalanced amount. However, the unbalanced amount adjusting machining is not preferred because of increases in machining time and machining cost, etc. Also, it can be considered that the gap between the center hole of the recording disk and the outer cylinder portion of the hub is made small in order to make the DBD small. However, if the gap is made small, the work efficiency when the recording disk is installed in the hub becomes deteriorated. That is, it is needed to perform assembly work while being careful not to incur deformations or damages of the parts, which incurs deterioration of the work efficiency and hence is not preferred. Also, in this case, it is needed to further improve the machining accuracy, and hence a machining cost is increased. In addition, making the gap between the center hole and the outer cylinder portion small, sometimes becomes an obstacle for the progress in the automatic assembly of disk drive devices.

The present inventors have reached the idea that, if the DBT can be made small almost without machining the hub and the recording disk, such as adjusting machining, and without improving the machining accuracy, the high density and the large capacity of disk drive devices can be attained without hampering an increase in the cost and automatic assembly of the devices.

SUMMARY OF THE INVENTION

Then, the present invention has been made to solve the aforementioned problems, and a purpose of the invention is to provide a disk drive device in which a DBT can be made small almost without machining a hub and a recording disk, such as adjusting machining, and without improving machining accuracy, etc.

In order to solve the aforementioned problems, a disk drive device according to an embodiment of the present invention comprises: a hub on which a recording disk is to be mounted; a base member; a bearing unit configured to support the hub in a manner in which the hub can be relatively rotated with respect to the base member; an extended annular groove portion provided in part of the hub around the rotational axis of the hub; and a weight member that is installed in the extended annular groove portion to adjust a rotational balance when the recording disk is being rotated with the hub, and that has a fixing mechanism that is slidable, when installed, in the direction of the extended annular groove portion and that can substantially maintain a stopped state at a fixing position.

According to this embodiment, a state of a rotational balance of the hub on which the recording disk has been mounted can be changed with the weight member being stopped after sliding, within the extended annular groove portion formed in the hub, the weight member in the direction of the extended annular groove portion. Because the weight member has the fixing mechanism that can substantially maintain a stopped state at the fixing position, a rotational balance state can be substantially maintained by stopping the weight member at a position where the rotational balance becomes acceptable.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Hereinafter, embodiments of the present invention will be described based on the accompanying drawings. The present embodiment is used in a brushless motor for driving a recording disk, the brushless motor being mounted in a hard disk drive apparatus (hereinafter, sometimes and simply referred to as an "HDD" or "disk drive device"), or used in a disk drive motor, etc., which is to be mounted in an optical disk recording and reproducing device (also, simply referred to as a disk drive device), such as a CD (Compact Disc) device and a DVD (Digital Versatile Disc) device.

Figure 1:
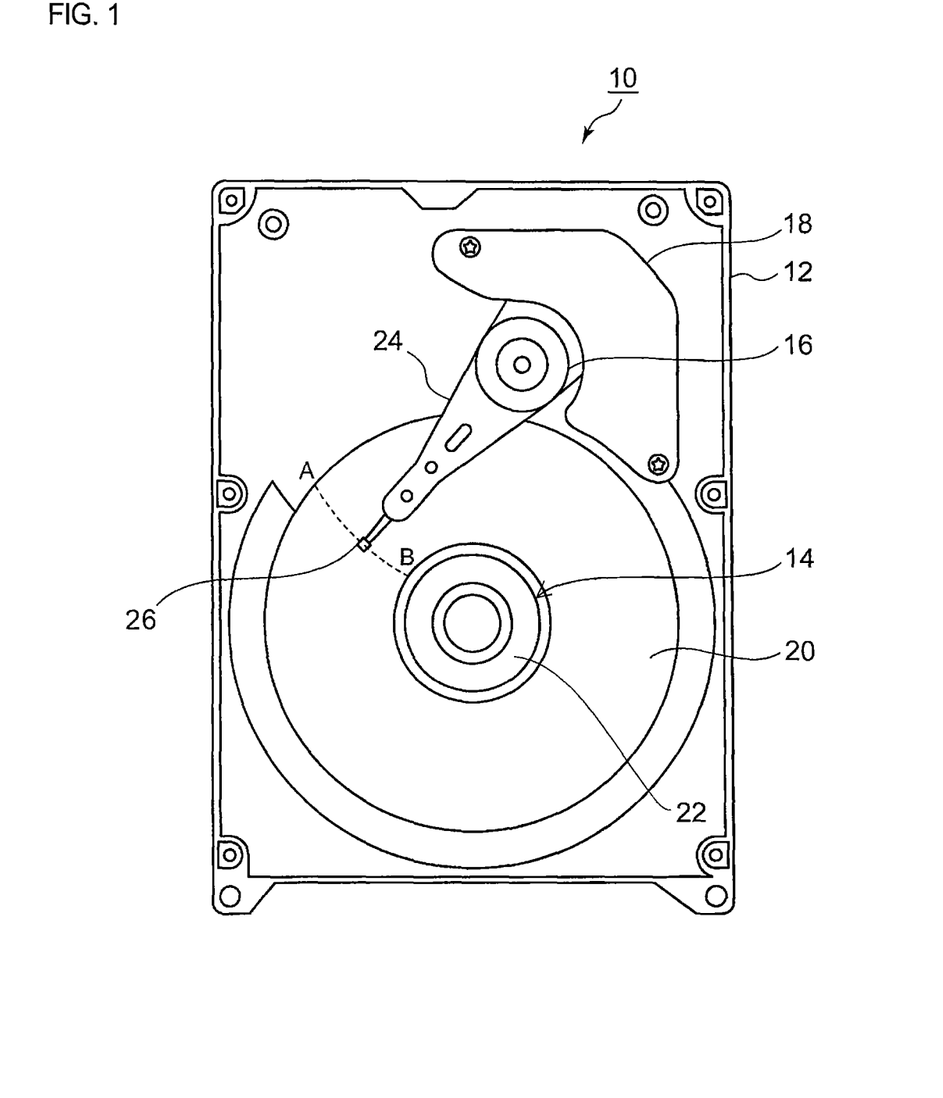
FIG. 1 is a view illustrating the internal structure of an HDD, which is an example of a disk drive device according to the present embodiment.

FIG. 1 is a view illustrating the internal structure of an HDD10 (hereinafter, simply referred to as a disk drive device 10), which is an example of the disk drive device according to the present embodiment. FIG. 1 illustrates a state in which a cover has been removed in order to expose the internal structure.

A brushless motor 14, an arm bearing unit 16, and a voice coil motor 18, etc., are installed on the upper surface of a base member 12. The brushless motor 14 supports, on the rotational axis, a hub 22 on which a recording disk 20 is mounted, and rotationally drives the recording disk 20 in which data is able to be stored for example, magnetically and read/write of the data can be performed. The brushless motor 14 can be, for example, a spindle motor. The brushless motor 14 is driven by a three-phase drive current consisting of a U-phase, a V-phase, and a W-phase. The arm bearing unit 16 supports a swing arm 24 within the movable range AB and in a swing-free manner. The voice coil motor 18 makes the swing arm 24 swing in accordance with external control data. A magnetic head 26 is fixed to the tip of the swing arm 24. When the disk drive device 10 is in an operating state, the magnetic head 26 moves, with the swing of the swing arm 24, within the movable range AB and above the surface of the recording disk 20 via a slight gap between the surface of the recording disk 20 and the magnetic head 26, thereby reading/writing data. It is noted that, in FIG. 1, the point A corresponds to the position at the outermost recording track of the recording disk 20 and the point B to the position at the innermost recording track thereof. The swing arm 24 may be transferred to a waiting position provided on the side of the recording disk 120 when the disk drive device 10 is in a stopped state.

In the present embodiment, a device including all of the components for reading/writing data, such as the recording disk 20, the swing arm 24, the magnetic head 26, and the voice coil motor 18, etc., is sometimes expressed as a disk drive device, or sometimes expressed as an HDD. Alternatively, only the part for rotationally driving the recording disk 20 is sometimes expressed as a disk drive device.

Figure 2:
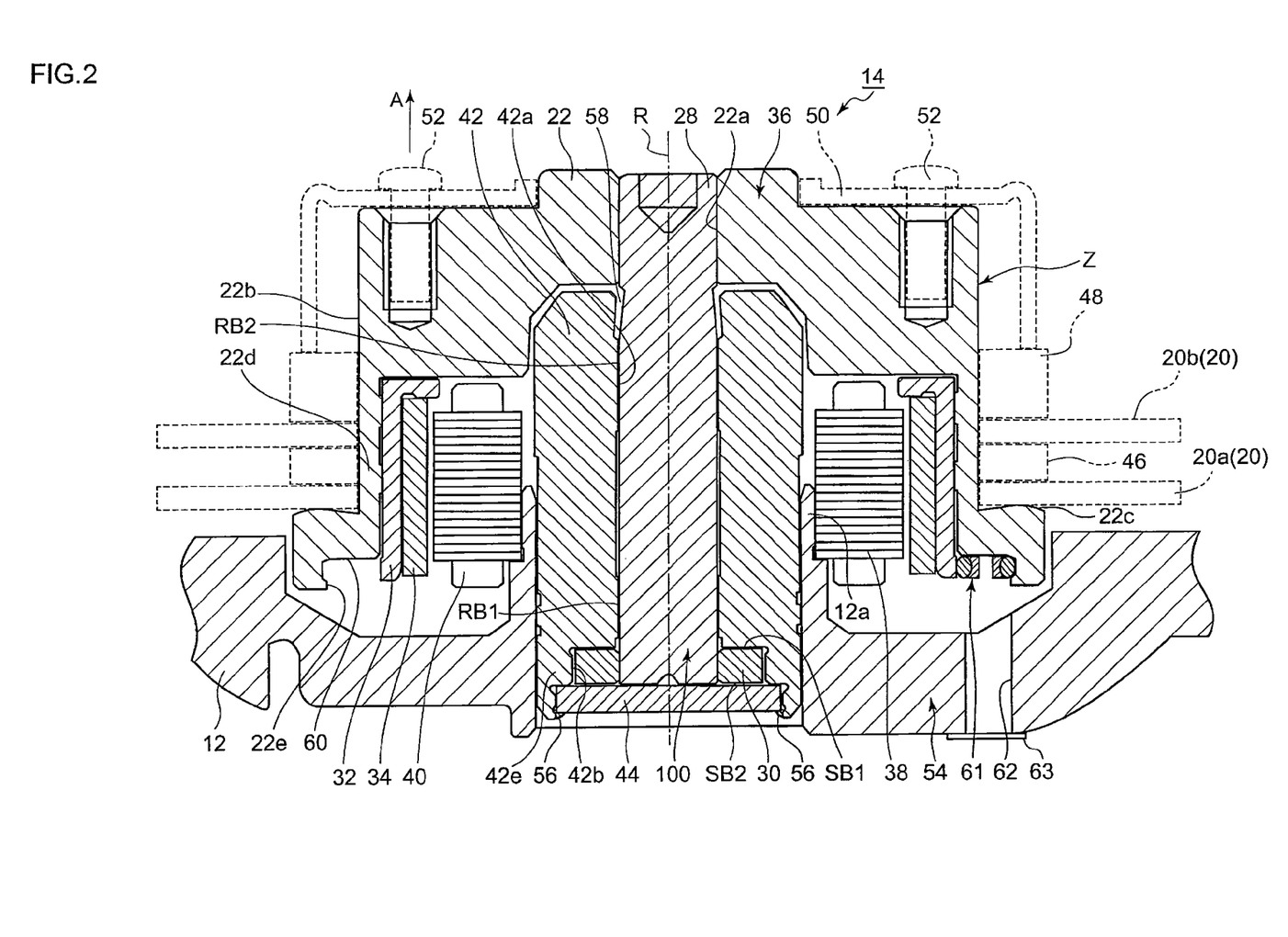
FIG. 2 is a schematic cross-sectional view of a brushless motor in the disk drive device according to the present embodiment.

FIG. 2 is a schematic cross-sectional view of the brushless motor 14 in disk drive device 10 according to the present embodiment. The brushless motor 14 rotates two 3.5"-recording disks 20 each having a diameter of, for example, approximately 95 mm, which are to be mounted in the disk drive device 10. In this case, the diameter of the central hole of each of the two recording disks 20 is 25 mm, and the thickness of the recording disk 20 is 1.27 mm. In the brushless motor 14, a rotor 36 functioning as a rotating body is composed of the hub 22 having an approximately cup-like shape, the shaft 28, a flange 30, a yoke 32, and a cylindrical magnet 34. Specifically, one end of the shaft 28 is fixed to an opening 22a provided at the center of the hub 22 with a combination of press-fitting and adhesion. The flange 30 is fixed to the other end of the shaft 28 in a press-fitting state.

The hub 22 is a component whose outer shape around the motor rotational axis R is convex-shaped. The central holes of the two recording disks 20a and 20b are fit into the outer cylinder surface 22b of the cylinder portion of the hub 22, the cylinder portion protruding in the arrow A direction of the view. In the present embodiment, the arrow A direction of the view is sometimes referred to as the "upper direction" or "upper surface side". Of the two recording disks 20, the recording disk 20a is installed by being seated on a seating portion 22c protruding in the radial direction from the end portion of the outer cylinder portion 22b of the hub 22. A first annular spacer 46 is arranged between the recording disks 20a and 20b. The first spacer 46 supports the recording disk 20b relative to the seating portion 22c. A second spacer 48 is arranged near to the upper surface of the recording disk 20b, the second spacer 48 being press-fixed by a clamper 50 for fixing the two recording disks 20. The clamper 50 is fixed to the hub 22 with a plurality of clamp screws 52. In the present embodiment, the diameter of the outer cylinder surface 22b of the hub 22 is, for example, 25 mm.

The hub 22 has a cylindrical partition wall portion 22d sandwiched by the yoke 32 and the two recording disks 20a and 20b. The yoke 32 has an L-letter-shaped cross-sectional and is formed of a magnetic material such as iron. The yoke 32 is fixed to the inner circumferential surface of the partition wall portion 22d with a combination of adhesion and press-fitting. A plurality of convex portions, against which the yoke 32 is pressed when the yoke 32 is being press-fit, are formed on the inner circumferential surface of the partition wall portion 22d. By applying an appropriate amount of adhesive to the inner circumferential surface of the partition wall portion 22d and by press-fitting the yoke 32 into the hub 22, the adhesive is injected between the inner circumferential surface of the partition wall portion 22d and the outer circumferential surface of the yoke 32, thereby acquiring uniform bonding strength.

Further, the cylindrical magnet 34 is fixed to the inner circumferential surface of the yoke 32 with adhesion. The cylindrical magnet 34 is formed of a rare earth metal, such as neodymium, iron, and boron and is arranged so as to be able to face, in the radial direction, for example, twelve salient poles that are formed on a laminated core 38. The cylindrical magnet 34 is provided with an n-pole drive magnetization in the circumferential direction (where n is an even number greater than or equal to 2). That is, the cylindrical magnet 34 is fixed to the hub 22 through the yoke 32.

The hub 22, the shaft 28, the flange 30, the yoke 32, and the cylindrical magnet 34, which are structured as stated above, are integrally rotated around the motor rotational axis R as the rotor 36 during the rotation of the brushless motor 14.

In the brushless motor 14 according to the present embodiment, a stator 54 functioning as a fixed body is composed of the base member 12, the laminated core 38, a coil 40, a sleeve 42, and a counter plate 44. The stator 54 rotatably supports the rotor 36 while the brushless motor 14 is being rotated. The base member 12 can also serve as the housing of the disk drive device 10. A cylindrical portion 12a centered on the motor rotational axis R is provided on the base member 12, and the sleeve 42 is fixed to the inner circumferential surface of the cylindrical portion 12a with adhesion. The sleeve 42 has a cylinder hollow-shaped housing portion 42a and further has a flange housing space portion 42b at its end portion, the flange housing space portion 42b being formed continuously with the sleeve 42 and being configured to rotatably house the flange 30 fixed to the end portion of the shaft 28. The flange housing space portion 42b is defined by a flange surrounding wall portion 42e that is formed continuously with the sleeve 42 and formed in the radial outside of the flange 30. That is, the shaft 28 to which the flange 30 is fixed is rotatably housed within the sleeve 42 including the housing portion 42a and the flange housing space portion 42b. In addition, the counter plate 44 is fixed, with the adhesive 56, to the end surface of the flange surrounding wall portion 42e by which the flange housing space portion 42b of the sleeve 42 is defined. Alternatively, the base member 12 may be a body separate from the housing of the HDD.

Lubricant is injected both between the shaft 28 and the sleeve 42 and between the flange 30 and the counter plate 44, in which the shaft 28 and the flange 30 are included in the rotor 36, and the sleeve 42 and the counter plate 44 are included in the stator 54. A bearing unit 100 rotatably supporting the hub 22 is composed of the shaft 28, the flange 30, the lubricant, the sleeve 42, and the counter plate 44.

A pair of herringbom-shaped radial dynamic pressure grooves RB1 and RB2, which are vertically spaced apart from each other, are formed on the inner circumferential surface of the sleeve 42. A herringbom-shaped first thrust dynamic pressure groove SB1 is formed on the surface of the flange 30, the surface facing the sleeve, and a herringbom-shaped second thrust dynamic pressure groove SB2 is formed on the surface of the sleeve 30, the surface facing the counter plate. When the brushless motor 14 is being rotated, the shaft 28 and the flange 30 are spaced apart from the surrounding wall surfaces by the dynamic pressure generated with these dynamic pressure grooves and the lubricant, thereby supporting the rotor 36 in the radial direction and the thrust direction. The radial dynamic pressure grooves RB1 and RB2 may be formed on at least one of the inner wall surface of the sleeve 42 and the outer wall surface of the shaft 28, which can generate similar radial dynamic pressure. Likewise, the thrust dynamic pressure grooves SB1 and SB2 may be formed on at least one of: the flange 30 and the surface of the flange housing space portion 42b, the surface facing the flange 30 in the thrust direction; and the flange 30 and the surface of the counter plate 44, the surface facing the flange 30, which can generates similar thrust dynamic pressure.

A capillary seal portion 58, in which the space between the inner circumferential surface of the sleeve 42 and the outer circumferential surface of the shaft 28 gradually expands upwards, is formed near to the open end of the sleeve 42. The capillary seal portion 58 has a function of preventing the lubricant from leaking out from the injected portion by capillarity.

The laminated core 38 has an annular portion and twelve salient poles extending outward in the radial direction from the annular portion. The laminated core 38 is formed by laminating, for example, eighteen thin electromagnetic steel plates and by integrating them with laser welding, etc. The coil 40 is wound around each salient pole. A drive magnetic flux is generated along the salient poles by flowing a three-phase drive current with an approximately sine wave shape through the coil 40. The inner circumferential surface of the annular portion of the laminated core 38 is fit, with a clearance fit, in the outer circumferential surface of the cylindrical portion 12a of the base member 12, and is fixed thereto with adhesive, etc. A drive unit 102 is composed of the laminated core 38, the coil 40, and the cylindrical magnet 34.

Operations of the brushless motor 14 structured as stated above will be described. A three-phase drive current is supplied to the coil 40 in order to rotate the brushless motor 14. Drive magnetic fluxes are generated along the twelve salient poles by flowing a drive current through the coil 40 to provide the cylindrical magnet 34 with torque in the rotational direction, thereby rotating the whole rotor 36.

Figure 3:
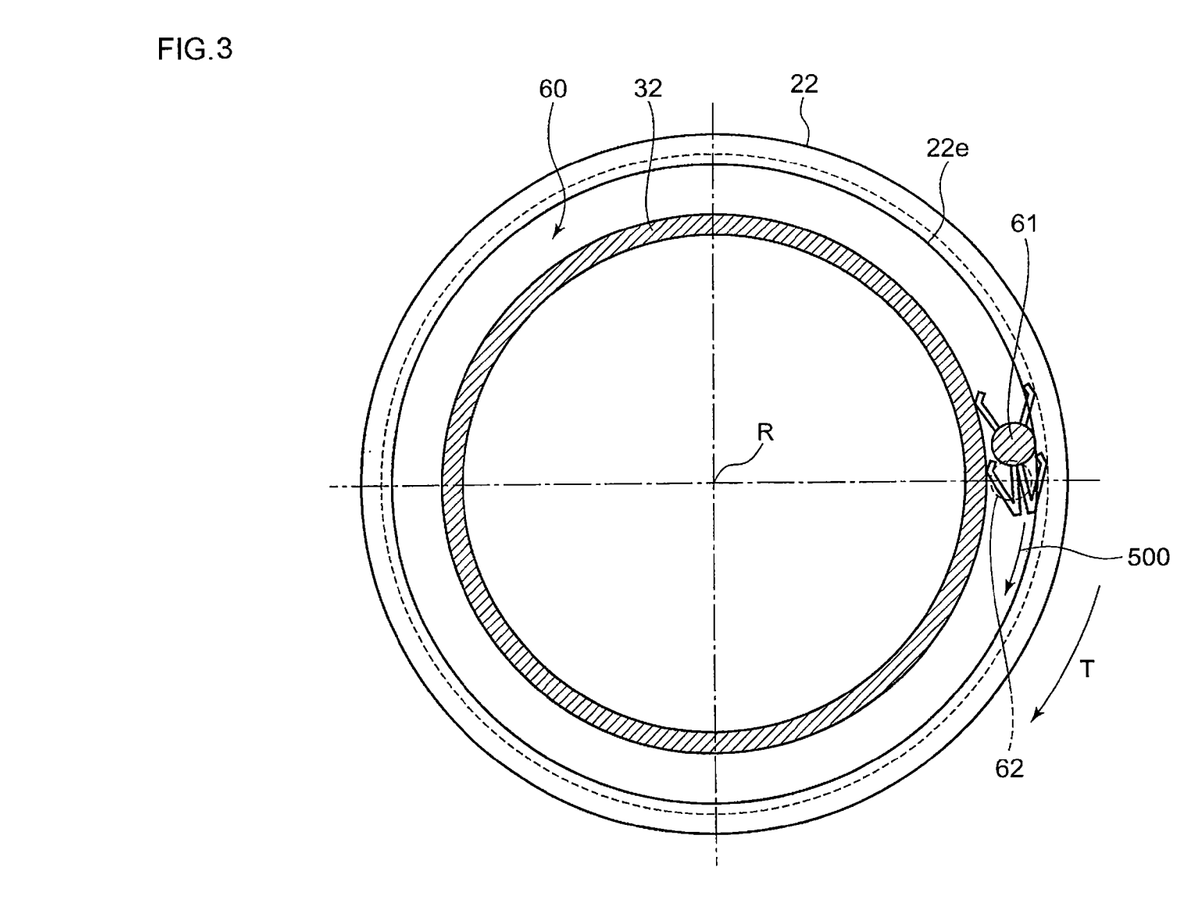
FIG. 3 is a view illustrating a state of an extended annular groove portion formed in a hub and of a weight member installed in the extended annular groove portion, when viewed from the base member side, in the disk drive device according to the present embodiment.

In the disk drive device 10 thus structured, the structure for reducing an unbalanced amount will be described with reference to FIG. 3 in addition to FIG. 2. FIG. 3 is a view illustrating a state of the hub 22 when viewed from the base member 12 side, in the disk drive device 10 according to the present embodiment.

As illustrated in FIGS. 2 and 3, an extended annular groove portion 60, which is provided so as to be extended in a circumferential shape around the motor rotational axis R of the hub 22, is formed at the end portion of the hub 22 near to the base member 12. In the case of FIG. 2, the side surface of the groove in the extended annular groove portion 60 is formed by the side surface of the end portion of the yoke 32 near to the base member 12. In this case, cutting can be performed so as to open one side surface of the extended annular groove portion 60. As a result, cutting for the extended annular groove portion 60 becomes easy, and also a protruding portion 22e, which will be described later, can be formed easily. In another embodiment, the extended annular groove portion 60 may be formed so as to be engraved in the end portion of the hub 22 near to the base member 12, the end portion of the hub 22 not including the side surface portion of the yoke 32. In this case, because there is no restriction by the position at which the yoke 32 is fixed, the position where the extended annular groove portion 60 is formed can be selected from a wide range, thereby allowing for the design flexibility to be improved.

A weight member 61 is installed in part of the extended annular groove portion 60. The weight member 61 is a member that is amounted in the extended annular groove portion 60 to adjust the total rotational balance when the recording disk is rotated with the hub 22. Further, the weight member 61 has a fixing mechanism that is slidable, when installed, in the direction of the extended annular groove portion 60, for example, in the arrow 500 direction and that can substantially maintain a stopped state at the fixing position.

Figure 4:
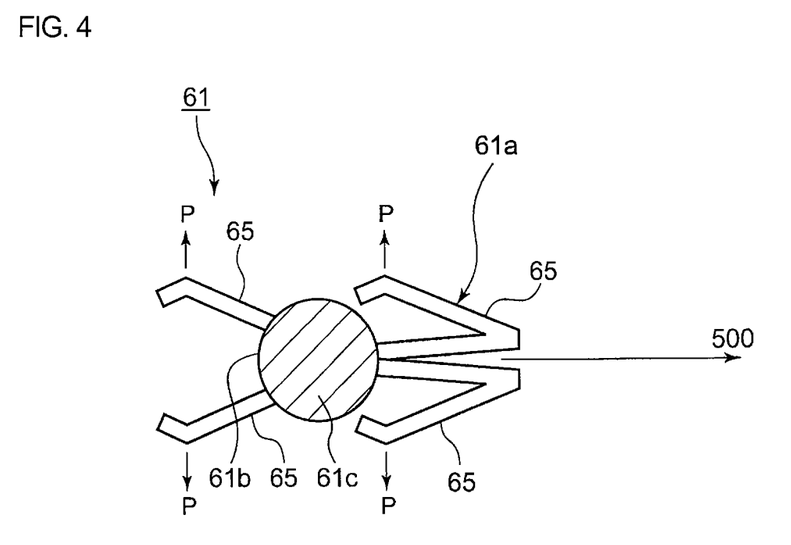
FIG. 4 is a view illustrating a shape example of the weight member applied to the disk drive device according to the present embodiment.

FIG. 4 illustrates an example of the shape of the weight member 61. The weight member 61 is structured to include: an elastic body portion 61a of which the fixing mechanism is composed; an engaging portion 61b used when sliding the weight member 61 within the extended annular groove portion 60; and an adjusting body portion 61c used for weight adjustment. In the structure of FIG. 4, the elastic body portion 61a is provided with, for example, four legs 65 formed of alloy steel having an elastic characteristic. The elastic body portion 61a can be formed of, for example, a stainless steel material, such as SUS 316, etc., so that a spring portion is included. A stainless steel material is preferred in terms of hardly being corroded. The elastic body portion 61a is connected with the adjusting body portion 61c such that the tip of the leg 65 is oriented to the direction opposite to the arrow 500 direction, the arrow 500 direction is one where the weight member 61 is slidable within the extended annular groove portion 60, and such that the tip thereof expands outward, i.e., expand toward the inner circumferential surface and the outer circumferential surface of the extended annular groove portion 60. As a result, the bias force pressing the inner circumferential surface and the outer circumferential surface of the extended annular groove portion 60 is generated in the legs 65, and thereby the fixing mechanism is structured in which a stopped state of the weight member 61 can be substantially maintained at the fixing position. And, it is designed that the weight member 61 is not transferred both when the rotation of the hub 22 is started and when the rotation thereof is stopped. Further, by providing spring performance having elastic force to the leg 65, the installation of the leg 65 into the extended annular groove portion 60 is made easy, thereby allowing for the assembly work efficiency to be improved.

The engaging portion 61b is used when the weight member 61 is transferred to a stopped position within the extended annular groove portion 60, the stopped position being an appropriate fixed position at which the weight member 61 is fixed. The weight member 61 can be transferred by applying acting force in the arrow 500 direction with a dedicated adjusting operation member, for example, a pair of tweezers and an operation pin, etc., being engaged with the concave portion, i.e., the engaging portion 61b.

The adjusting body portion 61c is used when fine adjusting a weight amount of the weight member 61. The mass of the weight member 61 includes the weight of the legs 65; however, the volume, i.e., the mass of the legs 65 can be adjusted only within a narrow range because the bias force is adjusted by the legs 65. Then, the total mass is freely changed by the adjusting body portion 61c. The adjusting body portion 61c may be formed of a metal material in the same way as the leg 65, such as stainless steel, or a resin material, such as plastics, etc. Or, it may be formed of a composite of the two.

Herein, the case is considered where the weight member 61 is to be transferred in the arrow 500 direction within the extended annular groove portion 60 by hitching an adjusting operation member, such as a pair of tweezers, on the engaging portion 61b of the weight member 61. As stated above, the leg 65 has a shape extending in the direction opposite to the arrow 500 direction. Accordingly, the weight member 61 can be easily slid to a desired position without the leg 65 being hitched on the inner circumferential surface and the outer circumferential surface of the extended annular groove portion 60, by applying operational force larger than the frictional force occurring between each of the inner circumferential surface and the outer circumferential surface of the extended annular groove portion 60, and the leg 65 having bias force against each of the aforementioned two surfaces of the extended annular groove portion 60. Conversely, when the weight member 61 receives operational force in the direction opposite to the arrow 500 direction, the leg 65 is inclined to expand in the arrow P direction by the friction occurring between each of the inner circumferential surface and the outer circumferential surface of the extended annular groove portion 60, and the leg 65, thereby automatically increasing the resisting force. That is, the weight member 61 is designed to have a shape having a characteristic in which the resisting force occurring when the weight member 61 is slid in the arrow 500 direction (first extended direction) within the extended annular groove portion 60, is smaller than that occurring when being slid in the opposite direction (second extended direction).

The force acting on the weight member 61 in the arrow 500 direction occurs when accelerated at the start of the operation of the disk drive device 10, and the force acting thereon in the direction opposite to the arrow 500 direction occurs when decelerated at the stop of the operation thereof. However, the magnitudes of the occurring forces are different from each other. For example, at the start of the rotation, it is designed that a large angular acceleration can be obtained in the rotational direction by passing a large current through the brushless motor 14 in order to quickly start reading/writing data from/into the recording disk 20. On the other hand, at the stop of the rotation, it is designed that the brushless motor 14 is naturally stopped with its loss by stopping the current supply to the brushless motor 14 because it is not particularly needed to quickly stop the recording disk 20. That is, an angular acceleration in the anti-rotational direction is small at the stop of the rotation. In other words, the weight member 61 receives large force in the direction opposite to the hub rotational direction because a large acceleration occurs at the start of the rotation of the hub 22, whereas the weight member 61 receives small force in the hub rotational direction because a deceleration is small at the stop of the rotation of the hub 22.

For example, when the hub 22 is initiated after being rotated in the clockwise direction T in FIG. 3, the weight member 61 receives force by which the weight member 61 is transferred in the counterclockwise direction because inertial force acts thereon. At the time, large resisting force occurs in the leg 65 of the weight member 61 with the leg 65 being expanded by the frictional force due to the shape thereof. As a result, it can be prevented that the weight member 61 may be transferred from its fixing position at the start of the operation. Conversely, the weight member 61 receives force by which the weight member 61 is transferred in the clockwise direction because inertial force acts on the weight member 61 at the stop of the rotation. In this case, the leg 65 of the weight member 61 is contracted by the frictional force occurring due to the shape thereof, thereby the resisting force against the transfer thereof becoming small. However, as stated above, the angular acceleration occurring at the stop of the rotation is small. Accordingly, it can be prevented even at the stop of the operation of the brushless motor 14 that the weight member 61 may be transferred if the static frictional force by the bias force generated by the leg 65, the bias force occurring when the weight member 61 is installed in the extended annular groove portion 60, is larger than the acting force by the angular acceleration occurring at the stop of the brushless motor 14.

Thus, the weight member 61 is configured not to be transferred by the rotation of the hub 22 in the predetermined direction at predetermined speed. In the present embodiment, the fact that a stopped state of the weight member 61 is substantially maintained at the fixing position means that the rotational balance of the rotating body including the hub 22 is maintained within an acceptable range, and it is to be assumed that a stopped state is substantially maintained even when the weight member 61 is transferred within the acceptable range. In the present embodiment of FIG. 3, it is assumed that, during a steady drive, the hub 22 is rotated in the clockwise direction at the speed of 7200 rpm. In such a specification, the bias force by the leg 65 has only to be determined from experiments, etc., taking into consideration the inertial force based on the acceleration of the hub 22 and the total mass of the weight member 61 such that the weight member 61 is not transferred at the start of the rotation and at the stop of the rotation of the hub 22.

In addition, as illustrated in FIG. 2, a base hole 62 is formed in the base member 12 such that at least part of the extended annular groove portion 60 is seen from the outside of the base member 12. The base hole 62 penetrates through the base member 12. In the case of FIG. 2, the base hole 62 is provided at the position where the radial distance of the base hole 62 from the rotational center of the hub 22 is substantially equal to the distance of the weight member 61 from the rotational center thereof. That is, it is designed that the radius of the annual groove portion 60 and the radius to the position where the base hole 62 is formed are substantially equal to each other, and that the base hole 62 is located immediately beneath the extended annular groove portion 60. In FIG. 3, for easy understanding of the positional relationship among the base hole 62, the extended annular groove portion 60, and the weight member 61, the position corresponding to that where the base hole 62 is formed is represented by the dashed line.

By forming the base hole 62 in such a position, the weight member 61 can be transferred to a position where the weight member 61 can be seen from the base hole 62, during one rotation of the hub 22 even when the weight member 61 is stopped at any position of the extended annular groove portion 60.

The weight member 61 is transferred to a position where the weight member 61 is seen from the base hole 62 in this way, and an adjusting operation member (jig), for example, a pair of tweezers, etc., is inserted from the base hole 62. Then, the adjusting operation member is made to be engaged with the engaging portion 61b or to grip the periphery of the engaging portion 61b of the weight member 61 that has been transferred to the position where the weight member 61 can be seen from the base hole 62. By rotating the hub 22 in the direction opposite to the arrow T direction of FIG. 3 while this state is being held, the weight member 61 can be stopped at any position within the extended annular groove portion 60 by relatively transferring the weight member 61 in the arrow 500 direction therewithin. In this case, the hub 22 may be rotated by powering the coil 40 or by externally and directly applying rotational force to rotate the hub 22.

Subsequently, adjustment of a reduction in an unbalanced amount using the weight member 61 will be described. An unbalanced vector consisting of an unbalanced direction and magnitude is at first detected when the weight member 61 is located at any position of the extended annular groove portion 60. It is noted that, herein, the hub 22 in which the weight member 61 is installed is sometimes referred to as a "rotating body". The unbalanced vector can be detected by, for example, a balancing machine. In this case, the recording disk 20 may or may not be installed in the hub 22. When the recording disk 20 is not installed in the hub 22, the work for adjusting a reduction in an unbalanced amount can be performed in the production process of the disk drive devices 10. On the other hand, when the recording disk 20 is installed in the hub 22, the work for adjusting a reduction in an unbalanced amount is to be performed after the assembly of the disk drive device 10 has been completed. In this case, the work thereof is performed in a state where the disk drive device 10 is actually used, thereby allowing for the adjusting accuracy to be improved.

Figure 5A:
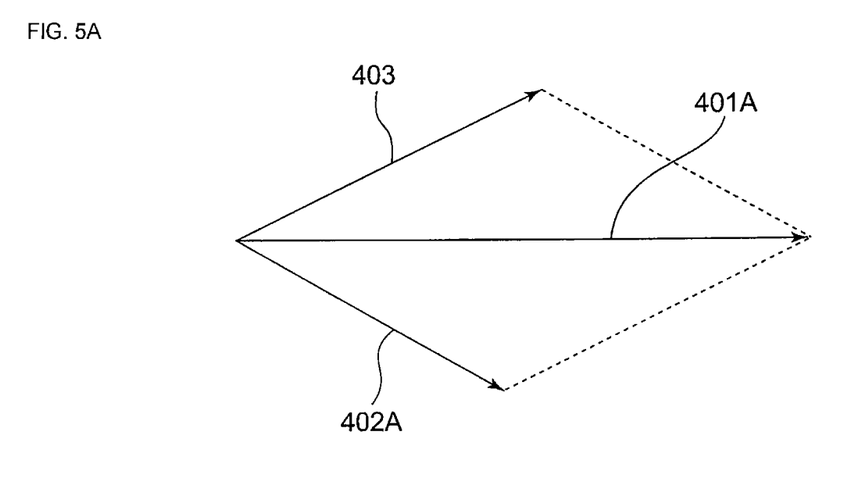
FIGS. 5A and 5B are views illustrating unbalanced vectors representing unbalanced amounts in the disk drive device according to the present embodiment.

FIGS. 5A and 5B are views illustrating unbalanced vectors. FIG. 5A illustrates an unbalanced vector 401A of a rotating body when the weight member 61 is located at any position. It can be considered that the unbalanced vector 401A of the rotating body is vector-synthesized from an unbalanced vector 403 when the weight member 61 is not present and that 402A when only the weight member 61 is present. The unbalanced vector 402A is defined by the mass of the weight member 61, a distance of the weight member 61 from the rotational center, and an angular position from the reference angle. In this case, because the mass of the weight member 61 and the distance of the weight member 61 from the rotational center are constant in terms of design, the unbalanced vector 402A substantially becomes a constant value if the weight member 61 is temporarily installed at a predetermined position of the extended annular groove portion 60 in the assembly line. Then, by subtracting the unbalanced vector 402A of only the weight member 61 from the unbalanced vector 401A of the rotating body, the unbalanced vector 403 of the rotating body when the weight member 61 is not present can be calculated. Accordingly, a magnitude of the unbalance of the rotating body can be reduced by transferring the weight member 61 in accordance with the unbalanced vector 403.

Figure 5B:
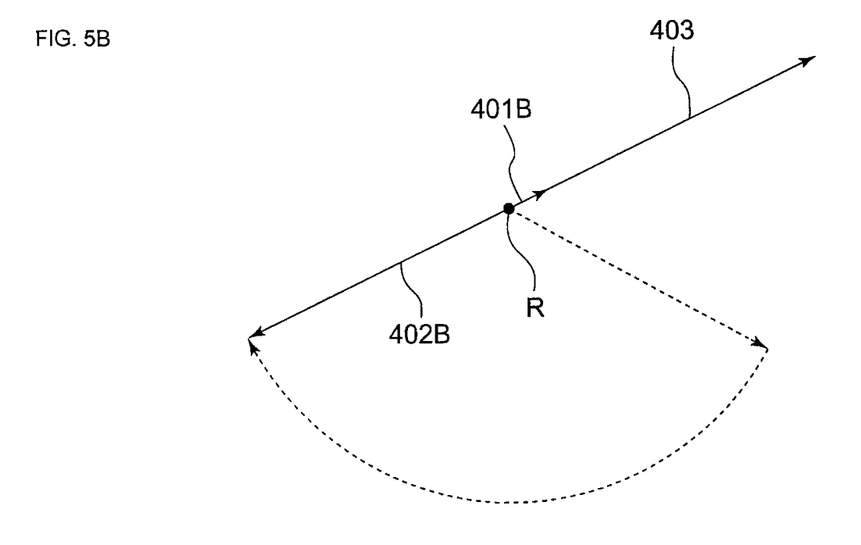

FIG. 5B illustrates the case where the weight member 61 is transferred in the direction opposite to the unbalanced vector 403 previously calculated, so that the motor rotational axis R (rotational center) is sandwiched by the two directions. In this case, part of the unbalanced vector 403 is offset by the unbalanced vector 402B of only the weight member 61. Accordingly, the unbalanced vector 401B of the rotating body becomes the minimum after the adjustment is performed by the transfer of the weight member 61. Herein, the maximum in the distribution of the magnitude of the unbalanced vector 403 of the rotating body when the weight member 61 is not present, is assumed to be M, and the average thereof is assumed to be A. Further, the magnitude of the unbalance 402 of only the weight member 61 is assumed to be W. For example, in the case where W=M/2, the maximum in the distribution of the magnitude of the unbalance 401 of the rotating body can be improved to M/2, and the average thereof to A/2, with the aforementioned structure and the adjustment by the transfer of the rotating body. As stated above, it is preferable that the mass of the weight member 61 is appropriately selected in accordance with the distribution in the magnitude of the unbalance of the rotating body.

When the base hole 62 in the disk drive device 10 is opened, fine foreign substances may enter the inside of the disk drive device 10. The entered foreign substances may be transferred through gaps to adhere to the recording disk 20. The foreign substances adhering to the recording disk 20 may make the operation of the disk drive device 10 unstable or cause a malfunction. Accordingly, it is preferable to seal the base hole 62 by fixing a sealing member 63 to the base hole 62. The sealing member 63 can be formed of various materials and into various shapes. For example, a PET film made of polyethylene terephthalate resin may be bonded to the base hole 62 to function as the sealing member 63. In this case, a PET film is preferred in terms of being inexpensive and excellent in work efficiency.

A method of manufacturing the disk drive device 10 including the aforementioned weight member 61 will be described. The fixed body and the rotating body, both of which the basic structure of the disk drive device 10 is composed of, are at first assembled. This step is referred to as a basic structure assembly step. When assembling the rotating body, the weight member 61 is installed in the extended annular groove portion 60 formed in the hub 22. Because the installation position where the weight member 61 is installed is a temporary position at the time, the installation position may be any position of the extended annular groove portion 60. Alternatively, the weight member 61 may be installed at a planned position determined beforehand as a temporal installation position. Subsequently, the recording disk 20 is installed in the hub 22 and fixed by using the clamper 50. This step is referred to as a disk fixing step. Subsequently, the unbalanced vector 401A is detected, the unbalanced vector 401A consisting of the unbalanced direction and magnitude of the hub 22 in which the weight member 61 is installed. This step is referred to as an unbalanced vector detection step. The unbalanced vector indicates a bias of the rotational balance of the hub 22. As illustrated in FIG. 5A, the unbalanced vector 403 occurring when the weight member 61 is not installed is calculated based on the unbalanced vector 401A and the known unbalanced vector 402B of only the weight member 61. Then, as illustrated in FIG. 5B, the weight member 61 is transferred to the position where part of the unbalanced vector 403 is offset by the unbalanced vector 402B of only the weight member 61. This step is referred to as an adjustment step. As previously described, adjustment of a reduction in an unbalanced amount can be performed in a state where the recording disk 20 is not mounted. In this case, the unbalanced vector detection step is executed after skipping the aforementioned disk fixing step. In this case, the installation of the recording disk 20 can be executed in the final stage, such as after completing adjustment of a reduction in an unbalanced amount, etc.

The adjustment step is composed of a plurality of steps, which are described hereinafter. The weight member 61 is at first transferred to the position where it is seen, by rotating the hub 22, from the outside of the base hole 62 formed to penetrate through the weight member 61. This step is referred to as a hub rotating step. Subsequently, an adjusting operation member, for example, a pair of tweezers, etc., is inserted from the base hole 62. This step is referred to as a tool insertion step. In this step, the adjusting operation member inserted from the base hole 62 is made to be engaged with the engaging portion 61b of the weight member 61. Alternatively, the engaging portion 61b or the periphery thereof is gripped with the adjusting operation member. That is, the hub 22 is rotated in a state where the weight member 61 is motionless relative to the base member 12 by engaging the adjusting operation member and the weight member 61 with each other. This step is referred to as a rotation adjusting step. In the rotation adjusting step, a relative position of the weight member 61 within the extended annular groove portion 60 can be changed by rotating the hub 22. That is, the position to which the weight member 61 is to be transferred is determined by transferring the position of the weight member 61 relative to the hub 22 so as to offset the unbalanced vector 403. After the transfer position has been determined, the adjusting operation member is taken out from the base hole 62 such that the weight member 61 remains within the extended annular groove portion 60. At this point, the final fixing position for the weight member 61 is determined within the extended annular groove portion 60. Then, entering of foreign substances, etc., are prevented by sealing the base hole 62 with the sealing member 63. This step is referred to as a sealing step. Finally, after the final assembly step in which a cover, etc., is installed on the base member 12, manufacturing of the disk drive device 10 is completed.

Figure 6A:
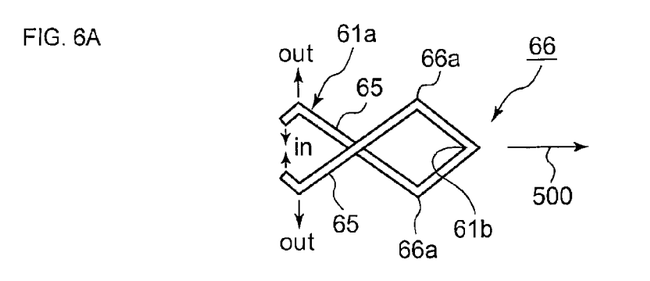
FIGS. 6A to 6C are views illustrating other shape examples of the weight member applied to the disk drive device according to the present embodiment.
Figure 6B:
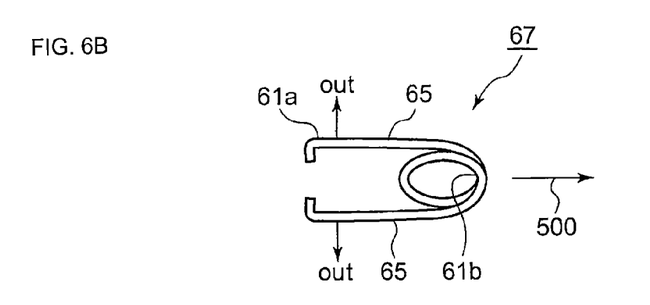
Figure 6C:
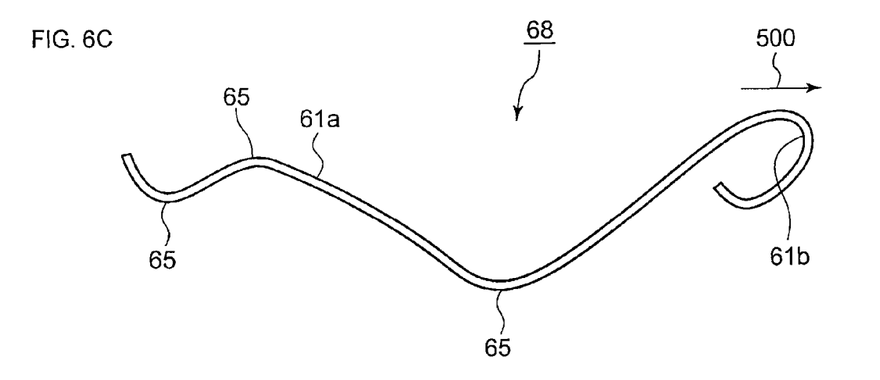

FIGS. 6A to 6C illustrate variations of the weight member 61. In these variations, weight members are formed of only wire-shaped materials.

A weight member 66 illustrated in FIG. 6A is made by molding a wire rod composed of alloy steel having an elastic characteristic into a "fish-shape", and the total mass of the wire rod becomes the mass of the weight member 66. In this variation, the leg 65 functioning as an elastic body portion 61a is formed by each of both end portions of the wire rod. Also, an engaging portion 61b is formed by a looped portion. By forming the elastic body portion 61a by a looped shape, an operation pin having a simple shape, for example, a rod shape, is available as an adjusting operation member. In this case, slide operations of the weight member 66 can be performed only by inserting the operation pin through the loop-shaped engaging portion 61b to hitch the engaging portion 61b. By forming the engaging portion 61b into a looped shape in this way, it becomes possible to perform adjusting work by inserting an operation pin through the engaging portion 61b with the use of an automatic assembly apparatus, thereby allowing for the automatization to be achieved easily. As stated above, when the weight member 66 is to be transferred to the fixing position, the weight member 66 is to be pulled in the arrow 500 direction by inserting an operation pin, etc., through the engaging portion 61b. In this case, because the leg 65 is contracted after receiving the force in the arrow "in" direction due to the frictional force with the contact surface of the extended annular groove portion 60 in the same way as the weight member 61, the force occurring due to the frictional force with the contact surface of the extended annular groove portion 60, the weight member 66 can be easily slid within the extended annular groove portion 60. On the other hand, when the inertial force acts on the weight member 66 in the direction opposite to the arrow 500 direction, the inertial force occurring at the start of the operation of the brushless motor 14 as stated above, the leg 65 expands in the arrow "out" direction to increase the static frictional force against the extended annular groove portion 60, thereby functioning so as to substantially maintain a stopped state of the weight member 66 at the fixing position. In this case, a bent portion 66a of the looped portion forming the engaging portion 61b expands toward the extended annular groove portion 60, which contributes to an increase in the static frictional force in the same way. Further, the bias force against the wall surface of the extended annular groove portion 60 by the leg 65 and the bent portion 66a, the bias force occurring when the weight member 66 is installed in the extended annular groove portion 60, is set to be larger than the acting force occurring due to the inertial force in the arrow 500 direction occurring when the rotation of the hub 22 is stopped.

A weight member 67 illustrated in FIG. 6B is also formed of a wire rod composed of alloy steel having an elastic characteristic in the same way as the weight member 66 of FIG. 6A. In the weight member 67, a looped portion to be the engaging portion 61b is formed by winding a wire rod. The magnitude of the bias force in the leg 65 of the elastic body portion 61a against the wall surface of the extended annular groove portion 60, and the total mass of the weight member 67, can be adjusted by appropriately selecting the number of windings or a winding radius in the looped portion. Also in this case, the resistance occurring when transferred in the arrow 500 direction is small and hence the transfer can be easily performed, and that occurring when transferred in the direction opposite to the arrow 500 direction is large and hence substantial maintenance of a stopped state at the fixing position can be sufficiently realized.

A weight member 68 illustrated in FIG. 6C is also formed of a wire rod composed of alloy steel having an elastic characteristic in the same way as the weight member 66 of FIG. 6A. In the case of the weight member 68, however, only a concavity and convexity relative to the wall surface of the extended annular groove portion 60 is formed other than the formation of a looped portion in the engaging portion 61b, and accordingly it is not needed to particularly specify details of the shape. In this case, the shape of the weight member 68 is easily molded, and is formed by using a simple forming machine. Further, because the weight member 68 can be arbitrarily shaped, an use amount of the wire rod can be appropriately changed, thereby allowing for adjustment of the mass of the weight member 68 to be easily performed. In the case of the weight member 68, the peak portion or the valley portion of the wire rod functions as the leg 65. Also, in this case, the resistance occurring when transferred in the arrow 500 direction is small and hence the transfer can be easily performed, whereas that occurring when transferred in the direction opposite to the arrow 500 direction is large, and hence substantial maintenance of a stopped state at the fixing position can be sufficiently realized.

In the case of the disk drive devices 10, such as an HDD, the disk drive device 10 sometimes receives an impact acceleration due to drop thereof while in use. The impact acceleration is set to be a maximum of 300 G in the quality test, etc. If the weight member 61 disengages from the extended annular groove portion due to such an impact, the weight member 61 may be sandwiched between the rotor 36, a rotating body, and the stator 54, a fixed body, thereby possibly making the disk drive device 10 unable to operate normally. Accordingly, it is preferable to design the weight member 61 so as to have the holding force by which the weight member 61 does not disengage from the extended annular groove portion even when receiving an impact acceleration of 300 G. The holding force can be obtained by the bias force generated by the leg 65 against the extended annular groove portion 60. As illustrated in FIG. 2, the extended annular groove portion 60 may have the protruding portion 22e that protrudes inward of a groove. Drop of the weight member 61 can be prevented with part of the extended annular groove portion 60 being sealed by the protruding portion 22e. The protruding portion 22e can be formed in conjunction with machining of the extended annular groove portion 60, and is preferred in terms of no need for additional members, etc. It is preferable to make the size of the overhang of the protruding portion 22e as large as possible within a range in which installation or a sliding operation of the weight member 61 is not hampered.

If a ferromagnetic material is contained in the weight member 61, the material sometimes cause a non-uniform region in the magnetic field generated by the cylindrical magnet 34. If the non-uniform region is present, an unevenness sometimes occurs in drive torque. The unevenness in the drive torque results in a rotational variation, which sometimes causes the error rate of the disk drive device 10 to be deteriorated. Accordingly, it is preferable that the weight member 61 is composed of a non-magnetic material or a weak magnetic material without including a ferromagnetic material. For example, stainless steel, such as SUS 304 or SUS 316, is preferred in terms of being a non-ferromagnetic material, not being a ferromagnetic material, and the deterioration in the error rate can be suppressed. It can also be designed that the aforementioned uneven area in the magnetic field is not formed by arranging the extended annular groove portion 60 so as not to overlap the cylindrical magnet 34.

When selecting a material of which the weight member 61 is composed, the hardness of the member has to be taken into consideration. For example, if the hardness of the portion of the weight member 61 contacting the extended annular groove portion 61 is low, abrasion of the leg 65 is likely to occur due to the transfer of the weight member 61. That is, there is the possibility that abrasion of the leg 65 may always occur while the weight member 61 is being slid to adjust an unbalanced amount. When abrasion occurs in the leg 65, the bias force to be generated becomes unstable. That is, the abrasion causes the performance of maintaining a stopped state of the weight member 61 at the fixing position to be deteriorated.

Therefore, in the present embodiment, the hardness of the portion of the weight member 61 contacting the extended annular groove portion 60, mainly the hardness of the leg 65, is made higher than that of the extended annular groove portion 60. As a result, the abrasion of the weight member 61, in particular, that of the leg 65 can be suppressed, and hence the aforementioned deterioration in the performance of maintaining a stopped state can be prevented. In this case, it is concerned that abrasion of the extended annular groove portion 60 may occur; however, it can be assumed that, when the weight member 61 is slid within the extended annular groove portion 60, a contact period of time is only one moment when focusing on a specific portion of the extended annular groove portion 60, and hence a continued contact does not occur. Further, as stated above, the leg 65 receives force by which the leg is contracted, while the weight member 61 is being slid, and hence it can be considered that abrasion of a specific portion of the extended annular groove portion 60 may hardly occur due to the leg 65 that passes through in a moment. Accordingly, the abrasion occurring when adjusting an unbalanced amount can be suppressed by making the hardness of the weight member 61 higher than that of the extended annular groove portion 60. In addition, because it can be considered that substantial slide does not occur in a stopped state after the adjustment of an unbalanced amount has been completed, it can be thought that abrasion may not occur.

Figure 7A:
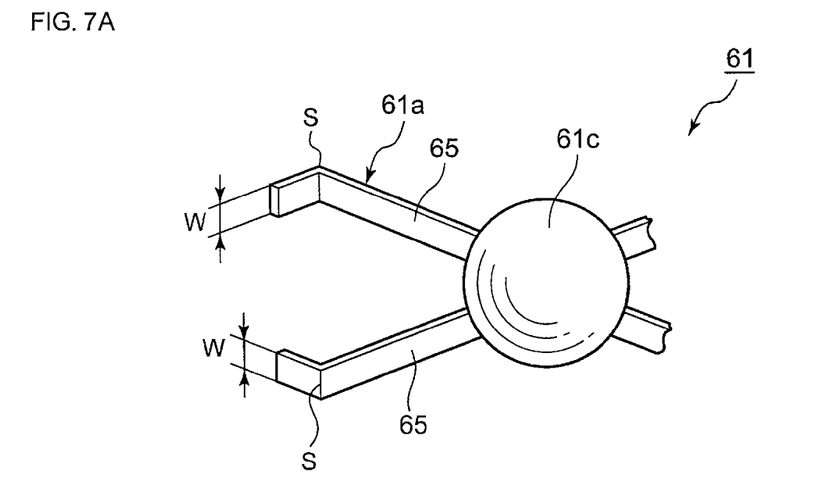
FIGS. 7A and 7B are views illustrating other shape examples of the leg of the weight member applied to the disk drive device according to the present embodiment.
Figure 7B:
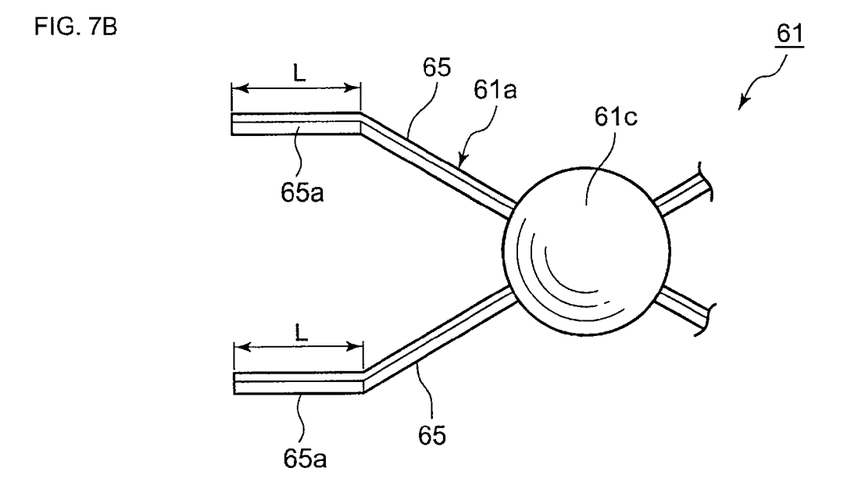

When the weight member 61 is in point-contact with the extended annular groove portion 60, the surface pressure in the contact area of the extended annular groove portion 60 becomes high, thereby the portion is sometimes dented. In this case, the slide of the weight member 61 is to be accompanied by large resisting force. In addition, there is sometimes the case where, when the weight member 61 is being slid, the weight member 61 is hitched on the dented portion of the extended annular groove portion 60 to scrape the portion. Accordingly, the portion of the weight member 60 according to the present embodiment, the portion contacting the extended annular groove portion 60, mainly the leg 65 may be shaped to be able to be in line-contact with the extended annular groove portion 60. For example, the portion contacting the extended annular groove portion 60 is designed to be in line-contact therewith by making the width W of the leg 65 wide, as illustrated in FIG. 7A. Alternatively, in another example, the shape of the extended portion 65a of the leg 65 is made to be the same as the curvature shape of the extended annular groove portion 60 in a state where the weight member 61 is installed in the extended annular groove portion 60, as illustrated in FIG. 7B, thereby making the whole L portion of the extended portion 65a be in line-contact, desirably in surface-contact with the extended annular groove portion 60. As a result, it becomes possible to make the surface pressure in the contact portion between the weight member 61 and the extended annular groove portion 60 low, and hence it can be suppressed that the contact portion may be dented.

If the frictional force in the portion of the weight member 61 contacting the extended annular groove portion 60 is large, the work for adjusting the unbalance cannot be sometimes performed smoothly. In the present embodiment, the extended annular groove portion 60 may be subjected to a treatment for reducing frictional force with the weight member 61, within a range in which a substantial stopped state can be maintained even for the aforementioned inertial force occurring at the start of the operation of the brushless motor 14, or for the acting force that may be provided to the weight member 61 when the disk drive device 10 is being used.

For example, grease can be applied to the extended annular groove portion 60. Application of grease is preferred in terms of easy work. Further, application of grease has an effect of preventing abrasion powder from being dispersed even if the abrasion powder is generated when the weight member is being slid. Furthermore, application of grease can suppress generation of the frictional heat occurring when the weight member 61 is being slid. For example, application of grease can prevent burn-in that is likely to occur when the materials of which the contact portions of the extended annular groove portion 60 and the weight member 61 are composed are both metal.

When the weight member 61 is slid within the extended annular groove portion 60 without interposition of grease, the contact resistance at the time is dependent on the surface state of the metal in the contact portion. That is, even in the extended annular groove portions 60 having the same shape as each other within an acceptable dimensional range, a portion having large resistance and a portion having small resistance appear at random, depending on a variation in the machining state. That is, the sliding resistance is to be different depending on a place where the weight member 61 and the extended annular groove portion 60 are in contact with each other. On the other hand, a difference between the contact resistances can be reduced by interposing grease to form an oil film in the contact portion between the extended annular groove portion 60 and the weight member 61. Thereby, the sliding property of the weight member 61 can be stabilized, and the work for adjusting an unbalanced amount can be performed easily and smoothly. The grease in which molybdenum disulfide has been added may be applied. In this case, the extreme-pressure property is improved and hence effects of applying grease can be sufficiently exhibited.

Regarding the structure of the base member 12 illustrated in FIG. 2, an example in which the base hole 62 is located immediately beneath the extended annular groove portion 60 has been described. In another embodiment, the base hole 62 may be formed at a position other than the position immediately beneath the extended annular groove portion 60, as long as the extended annular groove portion 60 is seen from the position, namely, the weight member 61 installed in the extended annular groove portion 60 is seen from the position. In other words, the position can be appropriately selected as long as the adjusting operation member can be engaged with the engaging portion 61b in the weight member 61 at the position, which can provide similar effects as in the present embodiment.

Also, in the present embodiment, an example in which the extended annular groove portion 60 is formed at the end portion of the hub 22 from which the base member 12 is seen has been described. In this case, there is a merit that an unbalanced amount can be adjusted even after the assembly of the disk drive device 10 has been completed. In another embodiment, the extended annular groove portion 60 may be formed at another position as long as a rotational balance of the hub 22 can be adjusted at the position. For example, the extended annular groove portion 60 may be formed on the side surface Z of the hub 22, etc., in FIG. 2. In this case, although the work for adjusting an unbalanced amount is to be performed during the assembly of the disk drive device 10, there is a merit that the position of the weight member 61 within the extended annular groove portion 60 can be seen visually and easily, and hence the work for adjusting an unbalanced amount can be performed easily.

In the aforementioned embodiment, the descriptions have been made assuming that the thickness of the recording disk 20 is 1.27 mm. When the thickness thereof is 1.50 mm, the DBD becomes much larger. Accordingly, the effects according to the present embodiment are remarkably exhibited. Likewise, when the thickness thereof is 1.75 mm, much more remarkable effects can be obtained.

In each aforementioned embodiment, the case where the laminated core is used has been described; however, the core may not be a laminated core. In each embodiment, the structure of the brushless motor 14 for HDDs has been described; however, even in a disk drive motor, which is mounted in an optical recording and reproducing device, such as CD device or DVD device, the technique of the present embodiment can be applied and similar effects as in the present embodiment can be acquired.

The present invention should not be limited to the aforementioned embodiments, and various modifications, such as design modifications, can be made with respect to the above embodiments based on the knowledge of those skilled in the art. The structure illustrated in each view is intended to exemplify an example, and the structure can be appropriately modified to a structure having a similar function, which can provide similar effects.

What is claimed is:

1. A disk drive device comprising:
a hub on which a recording disk is to be mounted;
a base member;
a bearing unit configured to support the hub in a manner in which the hub can be relatively rotated with respect to the base member;
an extended annular groove portion provided in part of the hub around the rotational axis of the hub; and
a weight member that is installed in the extended annular groove portion to adjust a rotational balance when the recording disk is being rotated with the hub, and that has a fixing mechanism that is slidable, when installed, in the direction of the extended annular groove portion and that can substantially maintain a stopped state at a fixing position, wherein the weight member is configured to exert a first resisting force within the extended annular groove portion when the weight member is slid in a first extended direction within the extended annular groove portion and is configured to exert a second resisting force within the extended annular groove portion when the weight member is slid in a second extended direction opposite to the first extended direction, and said first resisting force is smaller than said second resisting force.

2. The disk drive device according to claim 1, wherein the extended annular groove portion is formed at the end surface portion of the hub facing the inside of the base member, and wherein the base member has a base hole through which at least part of the extended annular groove portion is seen from the outside of the base member.

3. The disk drive device according to claim 2, wherein the radial distance of the base hole from the rotational center of the hub is substantially equal to the distance of the weight member from the rotation center thereof.

4. The disk drive device according to claim 1, wherein the weight member has an engaging portion that is to be engaged with an adjusting operation member when the weight member is being slid within a groove of the extended annular groove portion.

5. The disk drive device according to claim 1, wherein the weight member is configured to exert a holding force within the extended annular groove portion by which a stopped state of the weight member is substantially maintained at the fixing position within the extended annular groove portion both when the rotation of the hub is started and when the rotation thereof is stopped.

6. The disk drive device according to claim 1, wherein the weight member is configured to exert a holding force within the extended annular groove portion by which a stopped state of the weight member is substantially maintained even when receiving an impact acceleration of 300 G.

7. The disk drive device according to claim 1, wherein the extended annular groove portion has a protruding portion that protrudes inwards of a groove.

8. The disk drive device according to claim 1, wherein the fixing mechanism of the weight member includes an elastic member pressing the inner wall surface of the extended annular groove portion.

9. The disk drive device according to claim 8, wherein the elastic member includes a spring.

10. The disk drive device according to claim 9, wherein the spring is formed of a wire-shaped material.

11. The disk drive device according to claim 1, wherein the weight member contains a resin material.

12. The disk drive device according to claim 1, wherein the weight member is formed of a non-ferromagnetic material.

13. The disk drive device according to claim 1, wherein the extended annular groove portion is formed at a position where the extended annular groove portion does not overlap a magnet for generating rotational force of the hub in cooperation with a coil fixed to the base member, in the axial direction of the hub.

14. The disk drive device according to claim 1, wherein the hardness of a portion of the weight member contacting the extended annular groove portion is higher than that of the extended annular groove portion.

15. The disk drive device according to claim 1, wherein a portion of the weight member contacting the extended annular groove portion has a shape in which the portion is at least in line-contact with the extended annular groove portion.

16. The disk drive device according to claim 1, wherein a portion of the extended annular groove portion contacting the weight member is subjected to a treatment for reducing frictional force.

* * * * *